United States Patent [19]

Grantham

[11] 4,015,957
[45] Apr. 5, 1977

[54] EXTRACTOR FOR AIRBORNE PARTICULATE MATTER

[76] Inventor: Frederick W. Grantham, 12055 Goshen Ave., Los Angeles, Calif. 90066

[22] Filed: Sept. 12, 1975

[21] Appl. No.: 612,651

Related U.S. Application Data

[62] Division of Ser. No. 456,057, March 29, 1974, Pat. No. 3,920,425.

[52] U.S. Cl. .......................... 55/227; 261/DIG. 54
[51] Int. Cl.² ......................................... B01D 47/16
[58] Field of Search ............ 55/223, 226, 227, 228, 55/229, 235–239, 244, 246, 248, 416, 421, 429, 431, 337; 261/79 A, DIG. 54

[56] References Cited

UNITED STATES PATENTS

| | | | |
|---|---|---|---|
| 1,872,554 | 8/1932 | Badger | 55/241 X |
| 2,396,526 | 3/1946 | Nilsson | 55/238 X |
| 2,575,359 | 11/1951 | Ortgies | 55/223 |
| 3,412,529 | 11/1968 | Tailor | 55/238 X |
| 3,546,851 | 12/1970 | Hardison et al. | 55/416 X |
| 3,797,204 | 3/1974 | Cavatassi | 55/228 X |
| 3,920,425 | 11/1975 | Grantham | 55/238 |

FOREIGN PATENTS OR APPLICATIONS 611,273 3/1925 France ................................. 55/228

Primary Examiner—Frank W. Lutter
Assistant Examiner—David L. Lacey
Attorney, Agent, or Firm—Henry M. Bissell

[57] ABSTRACT

Apparatus for extracting, with minimal back-pressure effects, particulate matter carried by an airstream includes, in coupled sequence, a cyclone chamber for mixing the particulate-laden air with a uniformly distributed spray of water or other settling liquid, an airflow straightening chamber, a splash-limiting basin partially filled with the settling liquid and a porous particulate collector releasably coupled to the basin portion.

12 Claims, 3 Drawing Figures

U.S. Patent    April 5, 1977    4,015,957
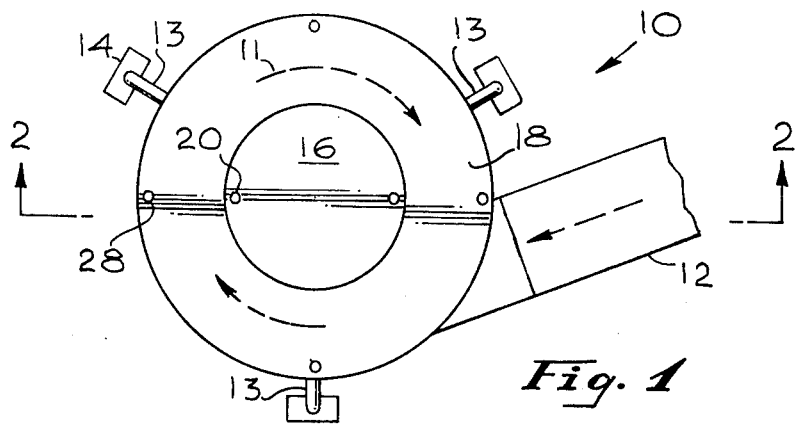
Fig. 1
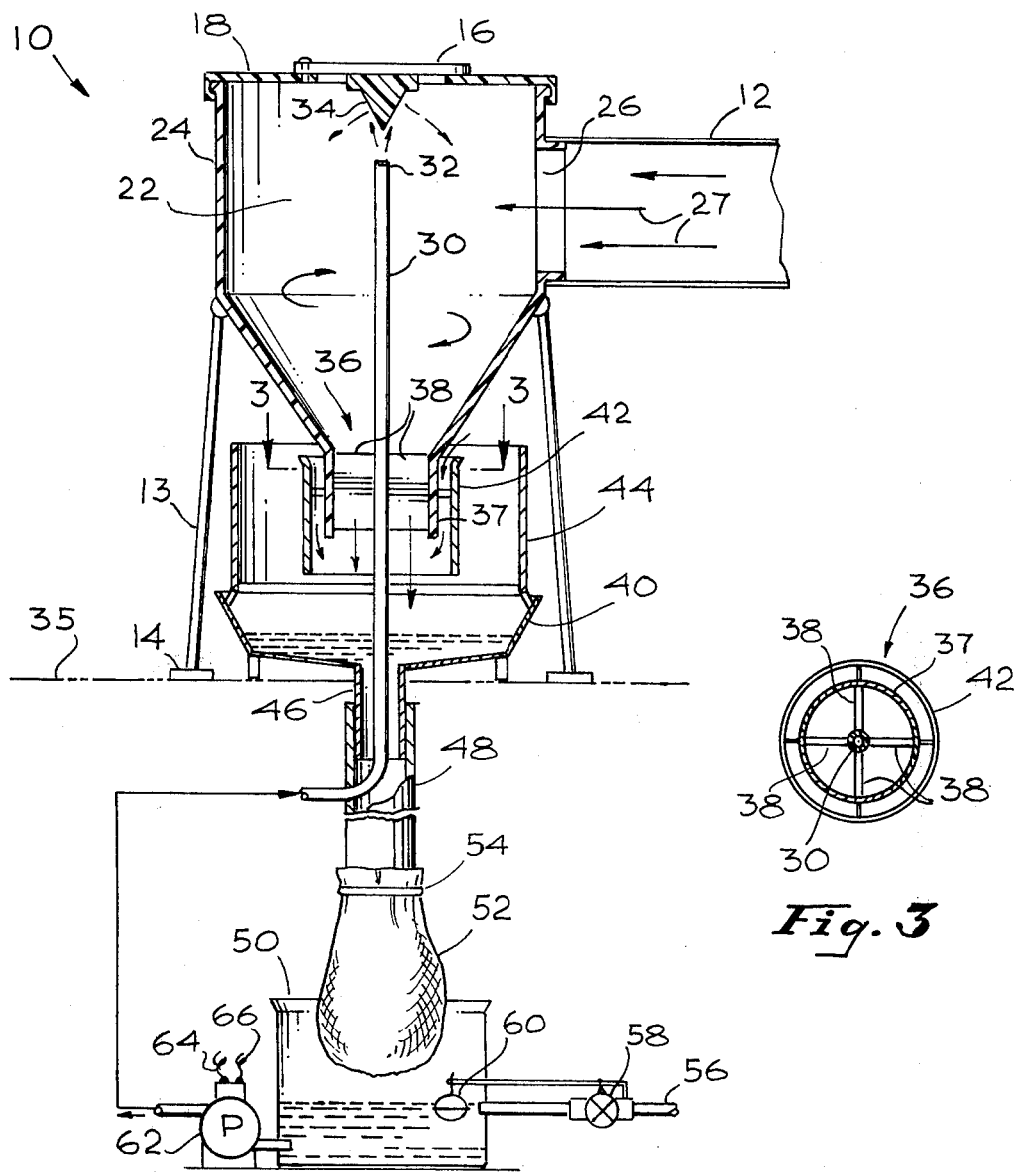
Fig. 2
Fig. 3

EXTRACTOR FOR AIRBORNE PARTICULATE MATTER

CROSS-REFERENCE TO RELATED APPLICATION

This application is a division of co-pending application Ser. No. 456,057, filed Mar. 29, 1974, entitled EXTRACTOR FOR AIRBORNE PARTICULATE MATTER, now U.S. Pat. No. 3,920,425.

BACKGROUND OF THE INVENTION

1. Field of the Invention

This invention relates to apparatus for extracting particulate matter from an air stream, for example, extracting lint carried by the air stream flowing from a laundry dryer.

2. Description of the Prior Art

Many commercial operations, for example, saw mills, flour mills, furniture factories and commercial laundries have a stream of exhaust air carrying particulate matter such as sawdust or lint. Environmental regulations and common sense dictate the removal of the particulate matter from the exhaust stream before it is released into the atmosphere. The particulate matter not only can cause damage to the environment if it is allowed to flow into the atmosphere unchecked, but the particulates, themselves, often have a commercial value which is lost if the air stream carrying the particulate matter is exhausted into the atmosphere.

In the commercial laundry industry, for example, large dryers are utilized. These dryers rely upon the flow of high-temperature air through the laundry tumbler or basket within the dryer to effect the removal of moisture from the laundry. Such a dryer is described in my U.S. Pat. No. 2,643,463 issued June 30, 1953. Because the rate of evaporation of water is proportional to the cube of the velocity of the air moving over the moisture-laden surface, it is essential for maximum efficiency in the drying process to minimize the back-pressure and other factors inhibiting the air flow through the system including the laundry dryer. Numerous types of lint traps are available presently in the laundry industry but they suffer from many limitations. For example, many of these lint traps rely on the use of baffles over which the air flowing from the dryer must pass in order to either be exhausted to the atmosphere or be recirculated. These baffles produce back-pressure in the air circulation system, thus reducing the velocity of the air. Similarly, screens or other forms of filters produced undesirable back-pressure. Additionally, screens and filters require frequent attention to prevent their becoming clogged and completely blocking the flow of air through the system. The cleaning or replacement of the filters may have to be done several times a week which seriously increases labor costs in a commercial laundry operation and, if the filters are disposable, it poses a continuing supply problem for replacement filters. Some of the lint traps having screens require burning of the lint off the screens. This not only causes pollution, which is unacceptable today, but also eliminates the recovery of the lint for commercial uses. For example, the lint which is recovered can be used as a filler in the manufacture of composition roofing shingles.

SUMMARY OF THE INVENTION

It is a general object of this invention to provide, for airborne particulate matter, an extractor which does not suffer from the disadvantages set forth hereinbefore.

It is an additional object of this invention to provide, for the extraction of airborne particulate matter, apparatus which requires minimal maintenance and repair.

It is a further object of this invention to provide, for the extraction of airborne particulate matter, apparatus which produces minimal back-pressure upon the means for moving the air.

It is a still further object of this invention to provide, for the extraction of airborne particulate matter from an air stream, apparatus which will not deteriorate in performance with its use.

Stated succinctly, my invention includes a first chamber into which the particulate-laden air stream is so directed as to produce a cyclonic or vortex motion of the air within that chamber. Water or other liquid is sprayed generally uniformly through that chamber to cause thorough moistening of the particulate materials. A second chamber eliminates the rotary motion of the air stream by means of baffle plates, permitting the downward flow of the settling liquid along with the particulate matter which it carries. The particulate matter falls into a basin which, during normal operation, is partially filled with water so as to cushion the fall of the liquid and minimize splashing. The downward direction of the air flow from the second chamber is sustained, in part, by a cylinder surrounding, spaced from and extending beyond the second chamber, such cylinder producing venturi effects and minimizing the dispersion of the particulate-bearing liquid into the atmosphere. Splashing of the liquid from the basin into the surrounding areas is reduced by means of an outer cylinder which acts as a splash-guard and a windbreaker. The settling liquid, including the particulate matter, passes into a porous bag which permits the liquid to flow into a reservoir for recirculation by pumping means. The porous receptacle, with its content of captured particulate matter, is conveniently removable.

BRIEF DESCRIPTION OF THE DRAWINGS

A better understanding of my invention may be had from a consideration of the following detailed description, taken in conjunction with the accompanying drawing, in which:

FIG. 1 is a top plan view of the extractor for airborne particulate matter, in accordance with my invention;

FIG. 2 is an elevational view taken in a section along line 2—2 in FIG. 1; and

FIG. 3 is a top plan view taken along line 3—3 of FIG. 2.

DESCRIPTION OF THE PREFERRED EMBODIMENT

In FIG. 1, extracting apparatus 10 has input duct 12 connected thereto as shown. Duct 12 may be connected at its remote end, not shown, to laundry dryer or other equipment which has an exhaust of particulate-carrying air under pressure. That air under pressure and carrying particulate matter passes from duct 12 into extractor 10 and produces a cyclonic or vortex action as indicated by the arrows 11 in FIG. 1. Legs 13 are provided to support extractor 10 on a substantially horizontal surface. Of course, legs 13 may be made adjustable to accommodate roofs which slope. Legs 13 have feet 14 at the lower extremities thereof for securing extractor 10 to a surface, such as a roof. Inspection plate 16 is secured to top plate 18 of extractor 10 by means of bolts 20. Inspection plate 16 is provided so as to permit inspection of the extractor during its operation.

In FIG. 2, other details of the extractor according to my invention are set forth. In FIG. 2, extractor 10 includes a mixing or cyclone chamber 22 formed by wall or walls 24 which may be of fiberglass for long life and minimum maintenance. In one portion of wall 24 aperture 26 is provided. Aperture 26 cooperates with duct 12 to permit the inward flow of air and airborne particulates (represented by arrows 27 in FIG. 2) from a forced air source, such as a laundry dryer. As was indicated in connection with the discussion of FIG. 1, the air stream is directed about the periphery of cyclone chamber 22 which results in the cyclonic or vortex action which has been described. The top of cyclone chamber 22 is closed by top 18 which may be secured to wall or walls 24 by means of bolts 28 which are visible in FIG. 1. Liquid, most commonly water, is introduced into cyclone chamber 22 by way of pipe 30 which, at its end 32, is aligned with the apex of conical- (or other) shaped water dispersing element 34. Because of the shape of element 34, the liquid spray which is produced is generally evenly distributed over a cross-section of cyclone chamber 22.

It should be noted that dispersing element 34 may be inverted and a stream of water caused to impinge upon it from the top. This configuration has been used but presents no particular advantage. The configuration shown in FIG. 2 requires that only one hole be cut in support 35, which may be the roof of a building, to permit both the influx of liquid and the efflux of mixed liquid and particulates.

THe cyclonic action produced by the swirling direction of the air stream from duct 12 combined with the generally even distribution of liquid spray causes a thorough mixing of the particulates and liquid, and the vortex and gravitational forces cause the mixture to move into a flow-straightener chamber 36 where a set of baffles 38 restrains the vortex motion which exists in chamber 22, with the result that the mixture of liquid and particulates, plus a flow of air, passes downwardly toward basin 40. The rate of flow of liquid from pipe 30 into cyclone chamber 22 is adjusted, by adjusting the speed of pump 62, for example, so that a residuum of liquid remains in basin 40 at all times during operation of the extractor. This residuum of liquid in basin 40 acts as a means for reducing the splashing of drops of moisture falling out of flow-straightener chamber 36 since the liquid surface is more resilient than would be the hard surface of the basin itself. Venturi cylinder 42 is concentric with and spaced from chamber 36. The flow of air through straightener chamber 36, by reason of venturi action, pulls air through the space between venturi cylinder 42 and the outer walls 37 of chamber 36 and causes the air flowing through chamber 36 to continue its downward motion towards basin 40 to assure the delivery of the maximum possible amount of moisture and particulates to basin 40. Additional venturi cylinders may be provided, if desired. Without venturi cylinder or column 42 the air, moisture and particulates would tend to disperse into the atmosphere before striking basin 40.

To assure maximum capture of the liquid which bears the particulates, splash shield 44 is provided, as shown. Splash shield 44, which may be supported from the basin 40, is generally concentric with venturi column 42 and is made of stainless steel to assure long life for this element. Particulate-bearing liquid flows through exhaust tube 46 of basin 40 into output pipe 48 which may be a few inches or many feet in length, its terminus being proximate to reservoir 50. Container 52 is secured to the lower extremity of pipe 48 by means of a collar 54 or other means. Collector 52 is made of porous material, for example, burlap, so that the settling liquid may pass through collector 52 into reservoir 50 while leaving behind, in collector 52, the particulate material.

The settling liquid, for example water, is introduced through inlet 56 which may have a float-controlled valve 58 in series between the source of settling liquid and the inner portion of reservoir 50. As has been indicated, valve 58 may be controlled by float 60 so as to assure an adequate level of liquid in reservoir 50 without experiencing any overflow of liquid from reservoir 50. It is to be noted that a large portion of the settling liquid is recovered and recirculated in this system. Pump 62, which may be of any desired variety, may be electrically powered through terminals 64 and 66 to cause the liquid from reservoir 50 to flow through pipe 30 into cyclone chamber 22. The rate of flow of settling liquid may be controlled by controlling the electrical power supplied to the motor portion of pump 62.

In FIG. 3, the air stream straightening baffle plates 38 are shown in their positions with respect to the wall of chamber 36. As has been indicated, baffle plates 38 stop the vortex action which is produced in cyclone chamber 22.

While extractor 10 has been shown in cylindrical configuration it is obvious tht it may be made in any other configuration as long as the fundamental functions which have been described hereinbefore are accomplished.

It is to be understood that the foregoing embodiment is illustrative of the application of the principles of my invention. Numerous other embodiments may be devised by those skilled in the art without departing from the spirit and scope of my invention.

What is claimed is:

1. Apparatus for extracting airborne particulates, said apparatus including:

a mixing chamber having a first, tangentially disposed upper opening for the introduction of airborne particulates into said chamber in a rotary motion and including means for producing a mixture of a settling liquid and said particulates, the mixing chamber also having a second, lower opening for air and said mixture to flow out through;

a basin positioned below the mixing chamber to collect the mixture of liquid and particulates while allowing the air to escape, the basin having an outlet opening for draining said mixture therefrom;

an air stream straightening chamber of cylindrical cross-section connected to the mixing chamber at the second opening thereof and positioned between the mixing chamber and the basin and including at least one baffle member for terminating the rotary motion of the air stream;

particulate collector means connected to the basin outlet opening to receive the flow of said mixture from the basin for collecting the particulates from the liquid; and a venturi cylinder surrounding, spaced from and extending beyond the straightening chamber in the direction of the basin.

2. Apparatus according to claim 1 which includes, in addition, a cylindrically shaped splash-guard member positioned between the mixing chamber and the basin and coaxially with respect to said venturi cylinder with a diameter exceeding the diameter of said venturi cylinder and having a portion thereof extending beyond said venturi cylinder in the direction of said basin.

3. Apparatus in accordance with claim 2 wherein the basin and the splash guard comprise means for reversing the flow of the air stream in the vicinity of the basin.

4. Apparatus in accordance with claim 2 wherein the diameter of the splash-guard member is less than the diameter of the basin so as to provide space between the splash-guard member and the basin for air to escape.

5. Apparatus in accordance with claim 1 in which the mixing chamber is cylindrical in shape with the axis of the cylinder being vertical and the center of the first opening is off-set laterally from said axis.

6. Apparatus in accordance with claim 1 wherein the mixture producing means comprises means for introducing liquid into the mixing chamber in a stream and a conical member having its apex facing the liquid introducing means.

7. Apparatus in accordance with claim 1 in which the particulate collector means is removable.

8. Apparatus in accordance with claim 1 in which the particulate collector means comprises a burlap bag.

9. Apparatus in accordance with claim 1 wherein the particulate collector means is liquid permeable for filtering particulates out of the settling liquid and further including a reservoir positioned to receive liquid filtered through the particulate collector means and means for directing the settling liquid from the basin outlet opening through the particulate collector means to the reservoir.

10. Apparatus in accordance with claim 9 wherein the basin outlet opening and a portion of the directing means are vertically aligned with the central vertical axis of the mixing chamber and, the mixture producing means a pipe extending upwardly within said portion and through said basin outlet opening into the mixing chamber for introducing a stream of liquid into the mixing chamber.

11. Apparatus in accordance with claim 9 further including means to control the level of the settling liquid in the reservoir.

12. Apparatus in accordance with claim 1 further including means for controlling the level of the settling liquid in the basin.

* * * * *